United States Patent
Yu et al.

(10) Patent No.: US 9,893,362 B2
(45) Date of Patent: Feb. 13, 2018

(54) RECHARGEABLE LITHIUM BATTERY AND NEGATIVE ELECTRODE FOR SAME

(71) Applicant: Samsung SDI Co., Ltd., Yongin, Gyeonggi-Do (KR)

(72) Inventors: Jung-Yi Yu, Yongin (KR); Woo-Cheol Shin, Yongin (KR); Sang-Il Han, Yongin (KR); Myung-Hwan Jeong, Yongin (KR); Tae-Hyun Bae, Yongin (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 665 days.

(21) Appl. No.: 13/802,318

(22) Filed: Mar. 13, 2013

(65) Prior Publication Data
US 2014/0141325 A1 May 22, 2014

(30) Foreign Application Priority Data
Nov. 21, 2012 (KR) ........................ 10-2012-0132430

(51) Int. Cl.
*H01M 10/0567* (2010.01)
*H01M 4/62* (2006.01)
(Continued)

(52) U.S. Cl.
CPC ........... *H01M 4/628* (2013.01); *H01M 4/485* (2013.01); *H01M 4/505* (2013.01); *H01M 4/525* (2013.01);
(Continued)

(58) Field of Classification Search
CPC .......................... H01M 4/131–4/1315; H01M 4/1391–4/13915; H01M 4/48;
(Continued)

(56) References Cited

U.S. PATENT DOCUMENTS 6,096,454 A * 8/2000 Tran .................... H01M 4/0438
429/231.8
6,365,299 B1  4/2002 Miyaki et al.
(Continued)

FOREIGN PATENT DOCUMENTS

JP   2007-311096 A   11/2007
JP   2008-103345 A    5/2008
(Continued)

OTHER PUBLICATIONS

Yuan et al. ("Lithium-Ion Batteries: Advanced Materials and Technologies," Published Dec. 2011 by CRC Press, pp. 1-10).*
(Continued)

*Primary Examiner* — Jonathan Crepeau
*Assistant Examiner* — Jacob Buchanan
(74) *Attorney, Agent, or Firm* — Knobbe Martens Olson & Bear LLP

(57) ABSTRACT

In an aspect, a rechargeable lithium battery that includes a positive electrode including a composite positive active material; a negative electrode including a carbon-based negative active material; an electrolyte including an additive, and a lithium salt and an organic solvent, wherein a passivation film may be on a surface of the negative electrode of the rechargeable lithium battery.

9 Claims, 16 Drawing Sheets

(51) Int. Cl.
  *H01M 4/525* (2010.01)
  *H01M 4/485* (2010.01)
  *H01M 4/505* (2010.01)
  *H01M 4/587* (2010.01)
  *H01M 10/0525* (2010.01)
  *H01M 10/42* (2006.01)

(52) U.S. Cl.
  CPC ....... *H01M 4/587* (2013.01); *H01M 10/0525* (2013.01); *H01M 10/0567* (2013.01); *H01M 10/4235* (2013.01)

(58) Field of Classification Search
  CPC ......... H01M 4/483–4/52; H01M 4/523–4/525; H01M 10/05–10/0569; H01M 10/4235
  USPC .................................................. 429/208–246
  See application file for complete search history.

(56) References Cited

U.S. PATENT DOCUMENTS

| | | | |
|---|---|---|---|
| 8,343,388 B2 | 1/2013 | Lee et al. | |
| 2002/0114995 A1* | 8/2002 | Thackeray | C01G 23/002 429/224 |
| 2003/0003358 A1* | 1/2003 | Mandal | C09K 21/12 429/188 |
| 2003/0157014 A1* | 8/2003 | Wang | C01B 31/02 423/445 R |
| 2005/0164093 A1* | 7/2005 | Otsuki | C07F 9/065 429/324 |
| 2009/0087362 A1 | 4/2009 | Sun et al. | |
| 2011/0117443 A1* | 5/2011 | Lee | H01M 10/052 429/328 |
| 2011/0236765 A1* | 9/2011 | Matsui | H01M 4/13 429/330 |
| 2011/0244324 A1* | 10/2011 | Jang | H01M 4/131 429/211 |
| 2013/0266846 A1* | 10/2013 | Kawasaki | H01M 4/13 429/163 |
| 2014/0199600 A1* | 7/2014 | Yawata | H01M 10/0567 429/330 |

FOREIGN PATENT DOCUMENTS

| | | |
|---|---|---|
| JP | 2009-004289 A | 1/2009 |
| KR | 10-2006-0109305 A | 10/2006 |
| KR | 10-2007-0092621 A | 9/2007 |
| KR | 10-2008-0023831 A | 3/2008 |
| KR | 10-2012-0041130 A | 4/2012 |
| KR | 10-2012-0089845 A | 8/2012 |
| WO | WO 2011/031546 A2 | 3/2011 |
| WO | WO 2013047342 A1 * | 4/2013 ........ G01M 10/0567 |

OTHER PUBLICATIONS

Yuan et al. ("Lithium-Ion Batteries: Advanced Materials and Technologies," Published Dec. 2011 by CRC Press, pp. 147-196).*

Y. Qin et al., "Electrolyte additive to improve performance of MCMB/LiNi$_{1/3}$Co$_{1/3}$Mn$_{1/3}$O$_2$ Li-ion cell," *Journal of Power Sources* 195 (2010) 6888-6892.

Andersson et al., "Chemical Composition and Morphology of the Elevated Temperature SEI on Graphite," *Journal of the Electrochemical Society*, 148 (10) A1100-A1109 (2001).

Korean Office Action dated Aug. 22, 2016 for Korean Patent Application No. KR 10-2012-0132430 which cites the above-identified references numbered 3-6, and from which subject U.S. Appl. No. 13/802,318 claims priority.

* cited by examiner (a)

(b)

RECHARGEABLE LITHIUM BATTERY AND NEGATIVE ELECTRODE FOR SAME

CROSS-REFERENCE TO RELATED APPLICATIONS

This application claims priority to and the benefit of Korean Patent Application No. 10-2012-0132430 filed in the Korean Intellectual Property Office on Nov. 21, 2012, the disclosure of which is incorporated herein by reference in its entirety.

BACKGROUND

Field

This disclosure relates to a rechargeable lithium battery and a negative electrode for a rechargeable lithium battery.

Description of the Related Technology

Recently, due to reductions in size and weight of portable electronic equipment, there has been a need to develop batteries for the portable electronic equipment that have both high performance and large capacity.

Rechargeable lithium batteries typically include a negative electrode, a positive electrode, and an electrolyte, and generate electrical energy through oxidation and reduction reactions.

The negative electrode of a rechargeable lithium batteries typically includes a negative active material such as lithium metal, carbon-based material, Si, and the like.

For a positive active material of rechargeable lithium batteries, metal chalcogenide compounds being capable of intercalating and deintercalating lithium ions, and for example, composite metal oxide such as $LiCoO_2$, $LiMn_2O_4$, $LiNiO_2$, $LiNi_{1-x}Co_xO_2$ (0<x<1), $LiMnO_2$, and the like have been used.

SUMMARY

One embodiment provides a rechargeable lithium battery having excellent battery performance due to low interface resistance.

Another embodiment provides a negative electrode for a rechargeable lithium battery having low interface resistance.

Some embodiments provide a rechargeable lithium battery that includes a positive electrode including a composite positive active material including one or more of Chemical Formulae 1 to 3; a negative electrode including a carbon-based negative active material; and an electrolyte including an additive represented by the following Chemical Formula 4, a lithium salt, and an organic solvent, wherein a passivation film including dots may be formed on a surface of the negative electrode after charge and discharge of the rechargeable lithium battery, $$pLi_2MO_3\text{-}(1-p)LiMeO_2 \qquad \text{Chemical Formula 1}$$

wherein in Chemical Formula 1,
0<p<1,
M may be at least one metal selected from Mg, Ca, Sr, Ba, Ti, Zr, Nb, Mo, W, Zn, Al, Si, Ni, Mn, Cr, Fe, Mg, Sr, V, or a rare earth element, and
Me may be at least one metal selected from Ti, V, Cr, Mn, Fe, Co, Ni, Cu, Al, Mg, Zr, and B (boron);

$$pLi_2MnO_3\text{-}(1-p)LiNi_aCo_bMn_cO_2 \qquad \text{Chemical Formula 2}$$

wherein in Chemical Formula 2,
0<p<1, 0<a<1, 0<b<1, 0<c<1, and a+b+c=1;

$$xLi_2MO_{3-y}LiMeO_{2-z}Li_{1+d}M'_{2-d}O_4 \qquad \text{Chemical Formula 3}$$

wherein in Chemical Formula 3,
x+y+z=1; 0<x<1, 0<y<1, 0<z<1; 0<d<0.33,
M may be at least one metal selected from Mg, Ca, Sr, Ba, Ti, Zr, Nb, Mo, W, Zn, Al, Si, Ni, Mn, Cr, Fe, V, or a rare earth element,
Me may be at least one metal selected from Ti, V, Cr, Mn, Fe, Co, Ni, Cu, Al, Mg, Zr, and B (boron), and
M' may be at least one metal selected from Ti, V, Cr, Mn, Fe, Co, Ni, Cu, Al, Mg, Zr, and B (boron).

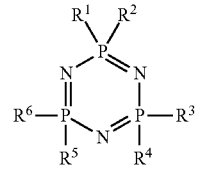

Chemical Formula 4 wherein in Chemical Formula 4, each of $R^1$, $R^2$, $R^3$, $R^4$, $R^5$, and $R^6$ may be a halogen, a substituted or unsubstituted alkoxy group, an amine group, a substituted or unsubstituted alkyl group, or $NR^7R^8$, wherein $R^7$ and $R^8$ may be the same or different, and are hydrogen or a substituted or unsubstituted alkyl group. In some embodiments, the passivation film may include LiF.

In some embodiments, the additive may be included in an amount of about 1 volume % to about 20 volume % based on the total amount, 100 volume % of the organic solvent.

In some embodiments, the carbon-based negative active material may be crystalline carbon.

In some embodiments, the dot may have a spherical shape having a diameter of about 0.2 μm to about 2 μm. In some embodiments, the dot may be present at an area of greater than or equal to about 1% and less than about 20% based on the entire area, 100% of the negative electrode.

In some embodiments, the charge and discharge may be performed at about 2.0V to about 4.65V. The charge and discharge may be performed at less than or equal to about 0.5 C.

Some embodiments provide a negative electrode for a rechargeable lithium battery including a carbon-based negative active material, and passivation film including dots on a surface thereof. In some embodiments, the passivation film may include LiF.

In some embodiments, the rechargeable lithium battery has a reduced interface resistance of a negative electrode, and resultantly improved battery performance.

DETAILED DESCRIPTION

Figure 1:
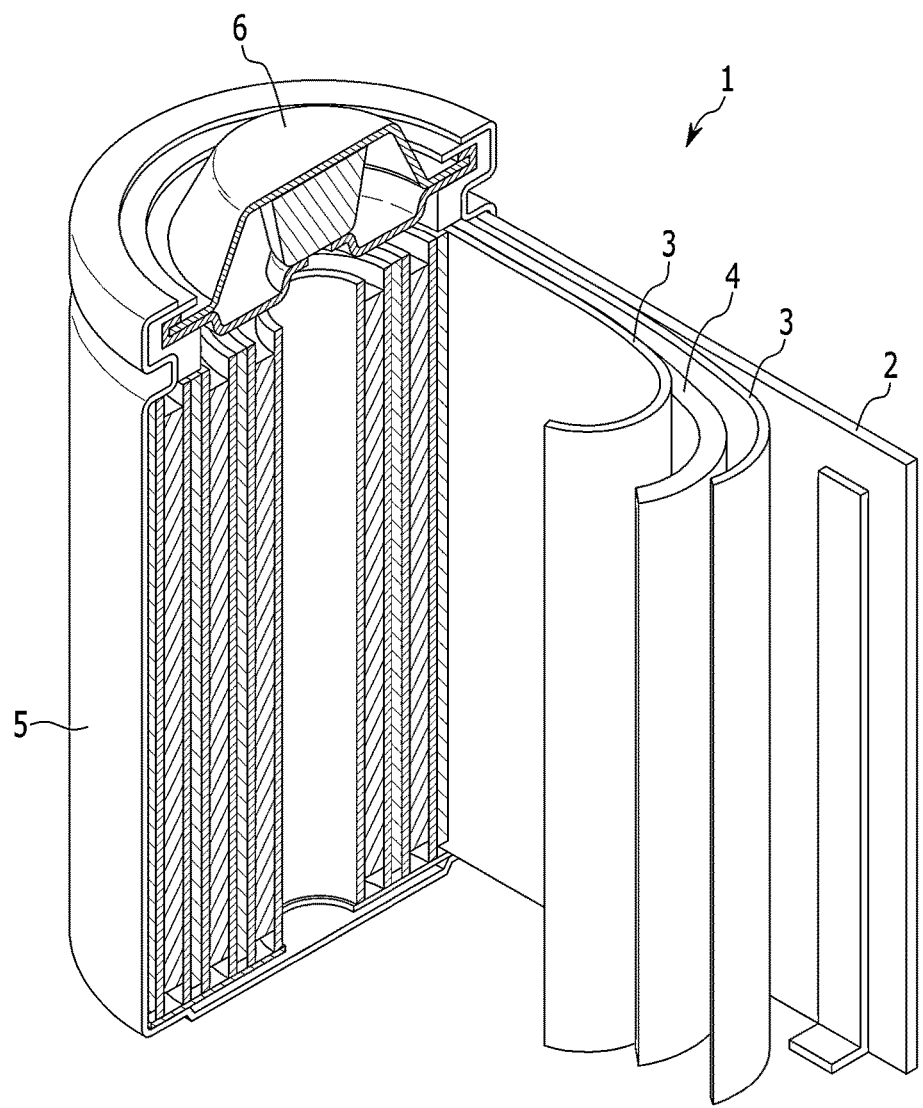
FIG. 1 is a schematic view showing the structure of a rechargeable lithium battery according to one embodiment.

Exemplary embodiments will hereinafter be described in detail. However, these embodiments are exemplary, and this disclosure is not limited thereto.

According to one embodiment, provided is a rechargeable lithium battery that includes a positive electrode including a composite positive active material including one or more of Chemical Formulae 1 to 3; a negative electrode including a carbon-based negative active material; and an electrolyte including an additive represented by the following Chemical Formula 4, a lithium salt, and an organic solvent, wherein a passivation film including dots may be formed on a surface of the negative electrode after charge and discharge of the rechargeable lithium battery;

$$pLi_2MO_3\text{-}(1-p)LiMeO_2 \quad \text{Chemical Formula 1}$$

wherein in Chemical Formula 1,
$0<p<1$,
M may be at least one metal selected from Mg, Ca, Sr, Ba, Ti, Zr, Nb, Mo, W, Zn, Al, Si, Ni, Mn, Cr, Fe, Mg, Sr, V, or a rare earth element, and
Me may be at least one metal selected from Ti, V, Cr, Mn, Fe, Co, Ni, Cu, Al, Mg, Zr, and B (boron);

$$pLi_2MnO_3\text{-}(1-p)LiNi_aCo_bMn_cO_2 \quad \text{Chemical Formula 2}$$

wherein in Chemical Formula 2,
$0<p<1$, $0<a<1$, $0<b<1$, $0<c<1$, and $a+b+c=1$;

$$xLi_2MO_{3-y}LiMeO_{2-z}Li_{1+d}M'_{2-d}O_4 \quad \text{Chemical Formula 3}$$

wherein in Chemical Formula 3,
$x+y+z=1$; $0<x<1$, $0<y<1$, $0<z<1$; $0<d<0.33$,
M may be at least one metal selected from Mg, Ca, Sr, Ba, Ti, Zr, Nb, Mo, W, Zn, Al, Si, Ni, Mn, Cr, Fe, V, or a rare earth element,
Me may be at least one metal selected from Ti, V, Cr, Mn, Fe, Co, Ni, Cu, Al, Mg, Zr, and B (boron), and
M' may be at least one metal selected from Ti, V, Cr, Mn, Fe, Co, Ni, Cu, Al, Mg, Zr, and B (boron);

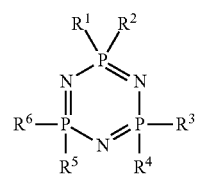

Chemical Formula 4 wherein in Chemical Formula 4, $R^1$, $R^2$, $R^3$, $R^4$, $R^5$, and $R^6$ may be the same or different and may a halogen, a substituted or unsubstituted alkoxy group, an amine group, a substituted or unsubstituted alkyl group, or $NR^7R^8$, wherein $R^7$ and $R^8$ are the same or different, and are hydrogen or a substituted or unsubstituted alkyl group. In some embodiments, the passivation film may include LiF.

In some embodiments, the additive of the above Chemical Formula 4 may include compounds represented by the following Chemical Formula 5 or the following Chemical Formula 6,

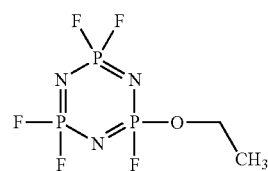

Chemical Formula 5

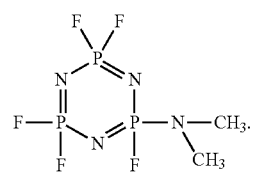

Chemical Formula 6

The positive active material represented by the above Chemical Formula 1 may be Li-rich layered positive active material, and has excellent capacity but a problem of having a little low safety and deteriorating capacity during the high voltage charge and discharge.

In order to solve this problem, a carbon-based negative active material and particularly, a crystalline carbon-based material such as artificial graphite or natural graphite may be used for a negative electrode to intercalate/deintercalate lithium and thus, secure stable cycle-life characteristic. However, the carbon-based negative active material may not effectively suppress capacity deterioration due to a serious interface side reaction of a negative electrode/an electrolyte during the high voltage.

Some embodiments provide a rechargeable lithium battery includes an electrolyte including the additive represented by the above Chemical Formula 4 and thus, forms a stable SEI (solid electrolyte interface) film having small resistance. In some embodiments, the rechargeable lithium battery may use a positive active material represented by one of the above Chemical Formulae 1 to 3 and thus, has high-capacity and also, a crystalline carbon-based negative active material and thus, cycle-life deterioration may be suppressed.

In some embodiments, the additive may be included in an amount of about 1 volume % to about 20 volume % based on the total amount, 100 volume % of the organic solvent. When the additive is included within the range, a stable SEI film may be formed on a negative electrode. In some embodiments, the negative electrode may have a surface having a spherical dot with a diameter ranging from about 0.2 μm to about 2 μm, and greater than or equal to about 1M of a lithium salt may be effectively dissolved without layer separation.

In one embodiment of the present disclosure, when the rechargeable lithium battery including the positive electrode including a composite positive active material including the above Chemical Formulae 1 to 3, the negative electrode including a carbon-based negative active material and an electrolyte including the additive represented by the above Chemical Formula 4, a lithium salt and an organic solvent, is charged and discharged on a surface of the negative electrode, the dot may be formed on the negative electrode. In some embodiments, the dot may have a spherical shape having a diameter of about 0.2 μm to about 2 μm. When the dot has a diameter of less than about 0.2 μm, a SEI film may be easily destroyed and secure no stable cycle life characteristic. When the dot has a diameter of greater than about 0.2 μm, the SEI film may increase resistance and deteriorate output of the rechargeable lithium battery.

Such a dot may be present at an area of greater than or equal to about 1% and less than about 20% based on the entire area, 100% of the negative electrode. When the dot has an area of less than about 1%, an electrolyte may have a continuous reduction decomposition and deteriorate cycle-life characteristic. When the dot has an area of greater than about 20%, the electrolyte solution may increase interface resistance and deteriorate a battery output.

In some embodiments, the negative electrode having the dot may have decreased impedance and resultantly, improve battery performance.

In some embodiments, the charge and discharge may be performed at about 2.0V to about 4.65V. This charge and discharge are performed for formation. When the charge and discharge is performed under the voltage range condition, a positive active material may be sufficiently activated, accomplishing sufficient capacity and thus, high-capacity. In some embodiments, the charge and discharge may be performed under a charge and discharge rate (C-rate) condition of less than or equal to about 0.5 C and specifically, ranging from about 0.01 C to about 0.5 C. In some embodiments, the charge and discharge rate may effectively provide a high power battery.

As described above, the negative electrode according to one embodiment of the present disclosure includes the carbon-based negative active material, and a passivation film including dots on a surface thereof. In some embodiments, the passivation film may include LiF.

In some embodiments, the negative electrode includes a negative active material layer including the negative active material and a current collector. In some embodiments, the passivation film including dots may be formed on a surface of the negative active material layer that is not in contact with the current collector. In some embodiments, the passivation film may include LiF.

In some embodiments, the negative active material layer may include about 95 wt % to about 99 wt % of the negative active material based on the total weight of the negative active material layer.

In some embodiments, the negative active material layer includes a binder, and optionally a conductive material. In some embodiments, the negative active material layer may include about 1 wt % to about 5 wt % of the binder based on the total weight of the negative active material layer. When the negative active material layer includes a conductive material, the negative active material layer includes about 90 wt % to about 98 wt % of the negative active material, about 1 wt % to about 5 wt % of the binder, and about 1 wt % to about 5 wt % of the conductive material.

In some embodiments, the binder improves binding properties of negative active material particles with one another and with a current collector. In some embodiments, the binder includes a non-water-soluble binder, a water-soluble binder, or a combination thereof.

In some embodiments, the non-water-soluble binder includes polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

In some embodiments, the water-soluble binder includes a styrene-butadiene rubber, an acrylated styrene-butadiene rubber, polyvinyl alcohol, sodium polyacrylate, a copolymer of propylene and a C2 to C8 olefin, a copolymer of (meth) acrylic acid and (meth)acrylic acid alkyl ester, or a combination thereof.

When the water-soluble binder is used as a negative electrode binder, a cellulose-based compound may be further used to provide a viscosity. In some embodiments, the cellulose-based compound includes one or more of carboxylmethyl cellulose, hydroxypropylmethyl cellulose, methyl cellulose, or alkali metal salts thereof. The alkali metal may be Na, K, or Li. In some embodiments, the cellulose-based compound may be included in an amount of about 0.1 parts to about 3 parts by weight based on 100 parts by weight of the binder.

In some embodiments, a conductive material may be included to improve electrode conductivity. Any electrically conductive material may be used as a conductive material unless it causes a chemical change. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

In some embodiments, the current collector may include a copper foil, a nickel foil, a stainless steel foil, a titanium foil, a nickel foam, a copper foam, a polymer substrate coated with a conductive metal, and a combination thereof, but is not limited thereto.

In some embodiments, the positive electrode may include a positive active material layer including the composite positive active material and a current collector. In the positive active material layer, the positive active material may be included in an amount of about 90 wt % to about 98 wt % based on the total weight of the positive active material layer.

In some embodiments, the positive active material layer may further include a binder and a conductive material. In some embodiments, the binder and the conductive material may be included in an amount of about 1 wt % to about 5 wt % based on the total weight of the positive active material layer, respectively.

In some embodiments, the binder improves binding properties of the positive active material particles to each other and to a current collector. Examples of the binder include polyvinylalcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

In some embodiments, the conductive material may improve electrical conductivity of a negative electrode. Any electrically conductive material can be used as a conductive material unless it causes a chemical change. Examples of the conductive material include a carbon-based material such as natural graphite, artificial graphite, carbon black, acetylene black, ketjen black, a carbon fiber, and the like; a metal-based material of a metal powder or a metal fiber made of copper, nickel, aluminum, silver, and the like; a conductive polymer such as a polyphenylene derivative, and the like; or a mixture thereof.

In some embodiments, the current collector may be Al foil but is not limited thereto.

In one embodiment of the present disclosure, the electrolyte includes the additive represented by the above Chemical Formula 4, an organic solvent, and a lithium salt. In some embodiments, the additive may be included in an amount of about 1 volume % to about 20 volume % based on the total amount, 100 volume % of the organic solvent.

In some embodiments, the organic solvent serves as a medium of transmitting ions taking part in the electrochemical reaction of the battery.

In some embodiments, the organic solvent may include a carbonate-based, ester-based, ether-based, ketone-based, alcohol-based, or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like, and the ester-based solvent may include methyl acetate, ethyl acetate, n-propyl acetate, dimethylacetate, methylpropinonate, ethylpropinonate, γ-butyrolactone, decanolide, valerolactone, mevalonolactone, caprolactone, and the like. In some embodiments, the ether-based solvent may include dibutyl ether, tetraglyme, diglyme, dimethoxyethane, 2-methyltetrahydrofuran, tetrahydrofuran, and the like, and the ketone-based solvent may include cyclohexanone and the like. In some embodiments, the alcohol-based solvent may include ethyl alcohol, isopropyl alcohol, and the like, and the aprotic solvent may include nitriles such as R—CN (where R is a C2 to C20 linear, branched, or cyclic hydrocarbon, a double bond, an aromatic ring, or an ether bond), amides such as dimethylformamide, dioxolanes such as 1,3-dioxolane, sulfolanes, and the like.

In some embodiments, the organic solvent may be used singularly or in a mixture. When the organic solvent is used in a mixture, the mixture ratio can be controlled in accordance with a desirable battery performance.

In some embodiments, the carbonate-based solvent may include a mixture with a cyclic carbonate and a linear carbonate. In some embodiments, the cyclic carbonate and the linear carbonate are mixed together in a volume ratio of about 1:1 to about 1:9. When the mixture is used as an electrolyte, it may have enhanced performance.

In some embodiments, the non-aqueous organic electrolyte may further include an aromatic hydrocarbon-based solvent as well as the carbonate-based solvent. In some embodiments, the carbonate-based solvents and the aromatic hydrocarbon-based solvents may be mixed together in a volume ratio of about 1:1 to about 30:1.

In some embodiments, the aromatic hydrocarbon-based organic solvent may be represented by the following Chemical Formula 7, Chemical Formula 7

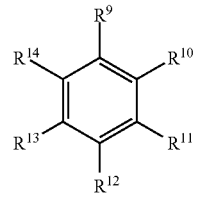

wherein in Chemical Formula 7, $R^9$ to $R^{14}$ may be each independently selected from hydrogen, a halogen, a C1 to C10 alkyl, a C1 to C10 haloalkyl, and a combination thereof.

In some embodiments, the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

In some embodiments, the electrolyte may further include vinylene carbonate or an ethylene carbonate-based compound represented by the following Chemical Formula 8 to improve cycle life, Chemical Formula 8

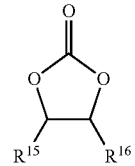

wherein in Chemical Formula 8, $R^{15}$ and $R^{16}$ may be each independently selected from hydrogen, a halogen, a cyano (CN), a nitro ($NO_2$), and a C1 to C5 fluoroalkyl group, provided that at least one of $R^{15}$ and $R^{16}$ is a halogen, a cyano (CN), a nitro ($NO_2$), and a C1 to C5 fluoroalkyl group, and $R^{15}$ and $R^{16}$ are not both hydrogen.

In some embodiments, the ethylene carbonate-based compound may include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the additive for improving cycle life may be flexibly used within an appropriate range.

In some embodiments, the lithium salt may be dissolved in an organic solvent to supply a battery with lithium ions, and facilitate transportation of the lithium ions between positive and negative electrodes. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers of 1 to 20, respectively), LiCl, LiI and $LiB(C_2O_4)_2$ (lithium bis(oxalato) borate). In some embodiments, the lithium salt may be used in a concentration ranging from about 0.1 M to about 2.0 M. When the lithium salt is included at the above concentration range, an electrolyte may have optimal electrolyte conductivity and viscosity, and may thus have enhanced performance and effective lithium ion mobility.

FIG. 1 is a schematic view showing the representative structure of a rechargeable lithium battery according to one embodiment. As shown in FIG. 1, the rechargeable lithium battery 1 includes a positive electrode 2, a negative electrode 4, and a separator 3 interposed between the positive electrode 2 and negative electrode 4, an electrolyte solution immersed therein, a battery case 5, and a sealing member 6 sealing the battery case 5.

The following examples illustrate the present embodiments in more detail. These examples, however, are not in any sense to be interpreted as limiting the scope of the present embodiments.

Example 1

A positive active material slurry was prepared by mixing a $0.45LiNi_{0.2}CO_{0.5}Mn_{0.3}O_2$-$0.55Li_2MnO_3$ positive active material, a polyvinylidene fluoride binder, and a denka black conductive material in a ratio of 90:4:6 wt % in N-methyl pyrrolidone.

The positive active material slurry was coated on an Al current collector, dried, and compressed, fabricating a positive electrode.

Additionally, a negative active material slurry was prepared by mixing an artificial graphite negative active material, a carboxylmethylcellulose thickener, and a styrene butadiene rubber binder in a ratio of 97.5:1:1.5 wt % in a water solvent.

The negative active material slurry was coated on a Cu current collector, dried, and compressed, fabricating a negative electrode.

In addition, an electrolyte was prepared by mixing ethylene carbonate, ethylmethyl carbonate and dimethyl carbonate in a volume ratio of 3:4:3 to prepare a mixture, and then adding 1.3 M of $LiPF_6$ to the mixture to afford a second mixture. Subsequently, an additive represented by the following formula 5 was added to the second mixture in an amount of 10 wt % based on the entire weight of the electrolyte.

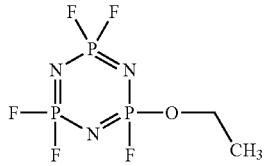

Chemical Formula 5

(commercially available product, Nippon Chemical Industry Co, Ltd. Tokyo, Japan).

The positive and negative electrodes and the electrolyte were used to fabricate a 2032 coin-type rechargeable lithium battery cell having a capacity of 4.5 mAh in a conventional method.

Example 2

The rechargeable lithium battery cell according to Example 1 was once charged and discharged with 0.05 C under a cut-off voltage condition ranging from 2.0V to 4.5V.

Example 3

The rechargeable lithium battery cell according to Example 1 was once charged and discharged with 0.05 C under a cut-off voltage condition ranging from 2.0V to 4.2V.

Example 4

The rechargeable lithium battery cell according to Example 1 was once charged and discharged with 0.05 C under a cut-off voltage condition ranging from 2.0V to 4.65V.

Comparative Example 1

A rechargeable lithium battery cell was fabricating according to the same method as Example 1 except for using an electrolyte prepared by dissolving 1.3M of $LiPF_6$ in a mixed solvent of ethylene carbonate, ethylmethyl carbonate, and dimethyl carbonate in a volume ratio of 3:4:3.

Comparative Example 2

The rechargeable lithium battery cell according to Comparative Example 1 was once charged and discharged with 0.05 C under a cut-off voltage ranging from 2.0V to 4.5V.

Comparative Example 3

The rechargeable lithium battery cell according to Comparative Example 1 was once charged and discharged with 0.05 C under a cut-off voltage ranging from 2.0V to 4.2V.

Comparative Example 4

The rechargeable lithium battery cell according to Comparative Example 1 was once charged and discharged with 0.05 C under a cut-off voltage ranging from 2.0V to 4.65V.

SEM Measurement

The rechargeable lithium battery cells charged and discharged according to Example 2 and Comparative Example 2 were decomposed, obtaining the negative electrodes therein. The negative electrode according to Example 2 was taken of a SEM photograph about the surface thereof. The SEM photograph is provided in FIG. 2A (enlargement: 2000 times, capture time: 40 seconds). FIG. 2B provides another SEM photograph enlarging a circled part in FIG. 2A (enlargement: 10,000 times, capture time: 40 seconds). FIG. 3A provides a SEM photograph showing the surface of the negative electrode according to Comparative Example 2 (capture time: 20 seconds), and FIG. 3B provides another SEM photograph showing the surface of the negative electrode according to Comparative Example 2 (capture time: 40 seconds).

Figure 2A:
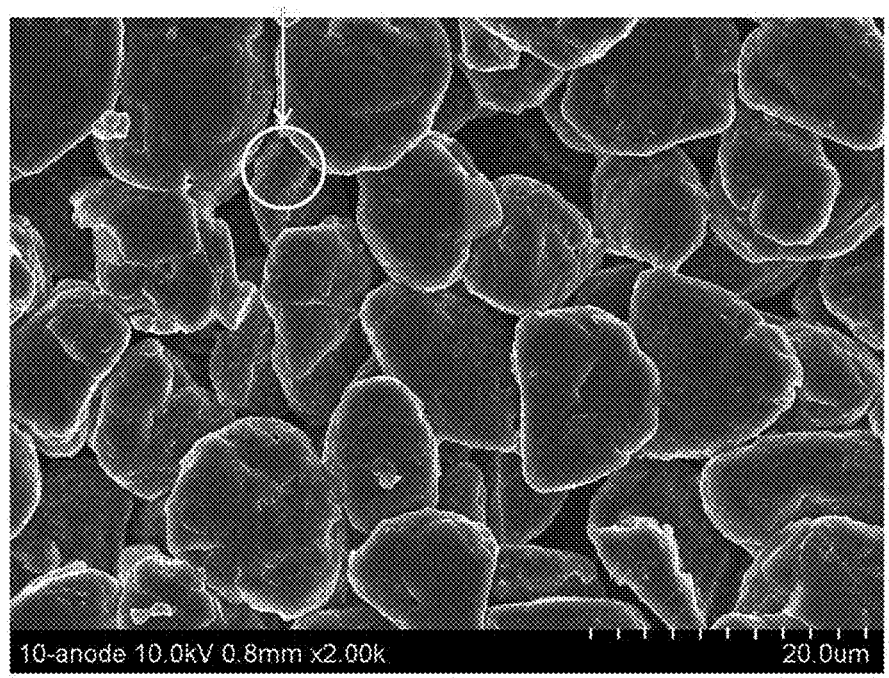
FIG. 2A is a SEM photograph showing the negative electrode obtained by disassembling a rechargeable lithium battery cell after the charge and discharge according to Example 2.
Figure 2B:
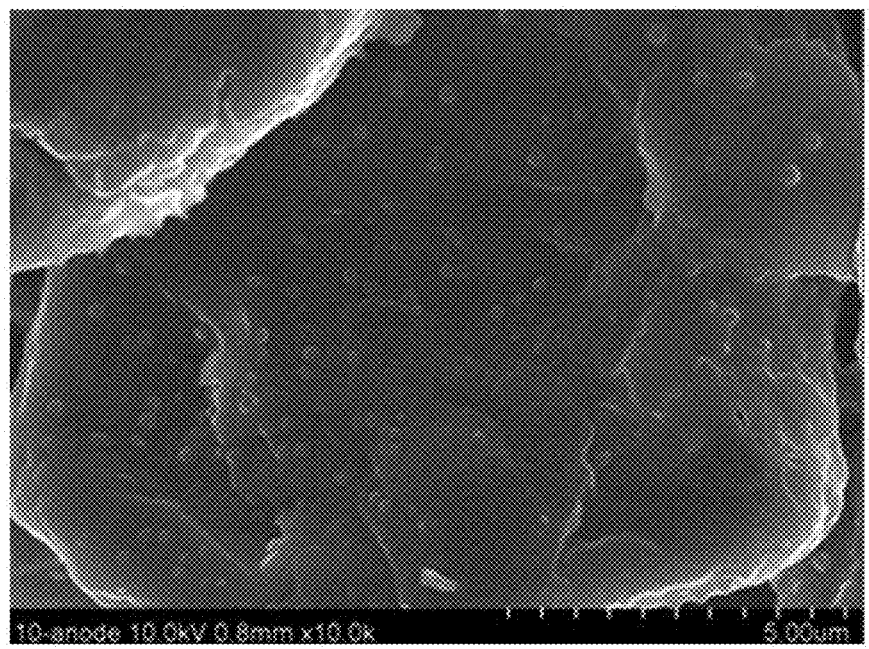
FIG. 2B is an SEM photograph enlarging FIG. 2A.
Figure 3A:
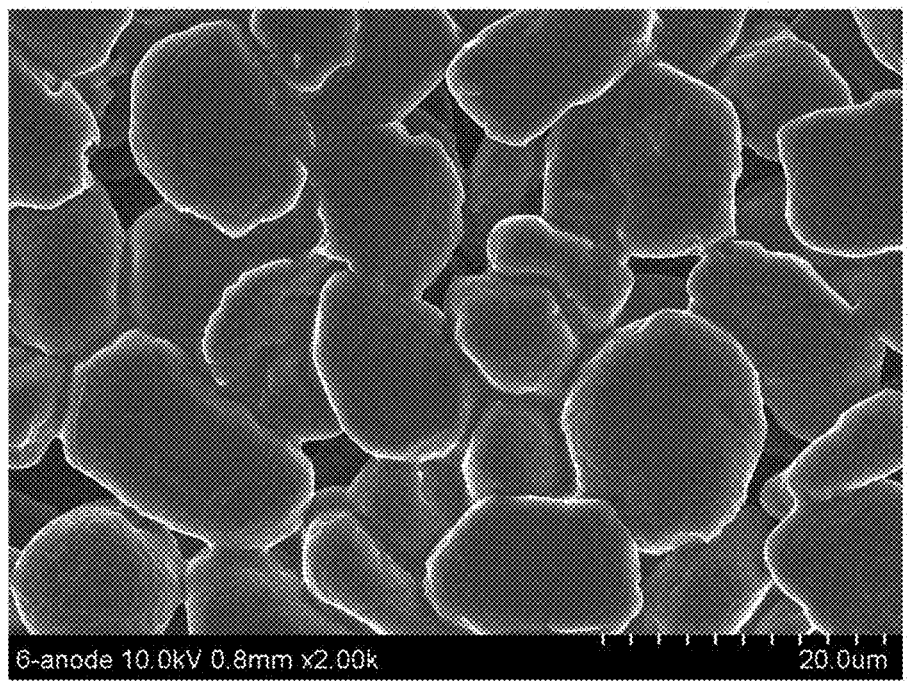
FIG. 3A is a SEM photograph (capture time: 20 seconds) showing the negative electrode obtained by disassembling a rechargeable lithium battery cell after the charge and discharge according to Comparative Example 2.

As shown in FIGS. 2A and 2B, the negative electrode according to Example 2 had a spherical dot with a diameter ranging from about 0.2 μm to 2 μm.

In contrast, the negative electrode according to Comparative Example 2 had not a dot but a wrinkle on the surface as shown in FIG. 3A, which shows that a thick polymeric layer formed of an active material was formed therein. In addition, the negative electrode according to Comparative Example 2 had a hole in the center of the surface as shown in FIG. 3B taken by increasing the capture time to 40 seconds. The hole shows that a thick polymeric passivation film formed on the artificial graphite negative active material was destroyed by an electron beam, since the artificial graphite negative active material was not destroyed by the electron beam.

Figure 3B:
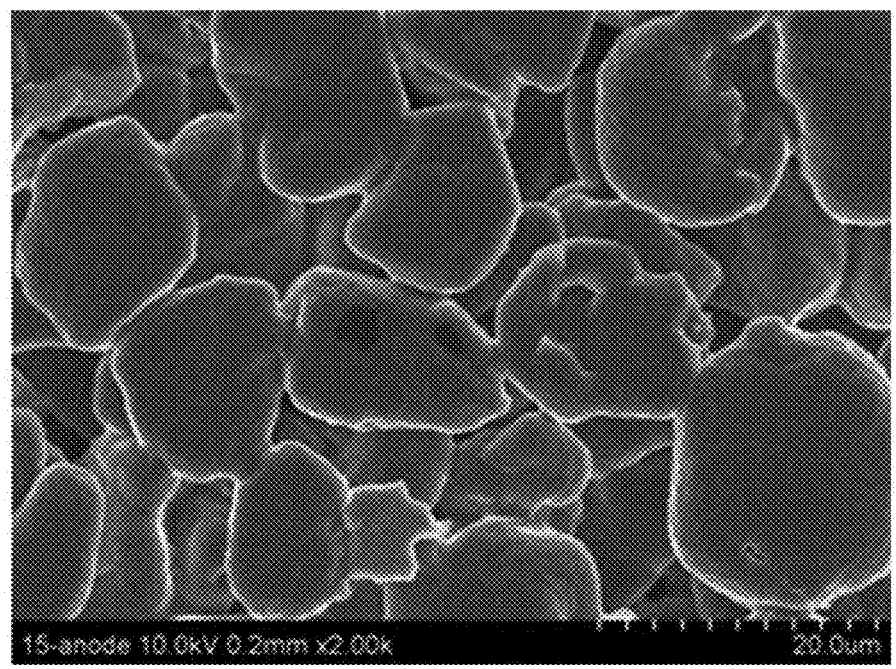
FIG. 3B is a SEM photograph (capture time: 40 seconds) showing the negative electrode obtained by disassembling the rechargeable lithium battery cell after the charge and discharge according to Comparative Example 2.
Figure 4:
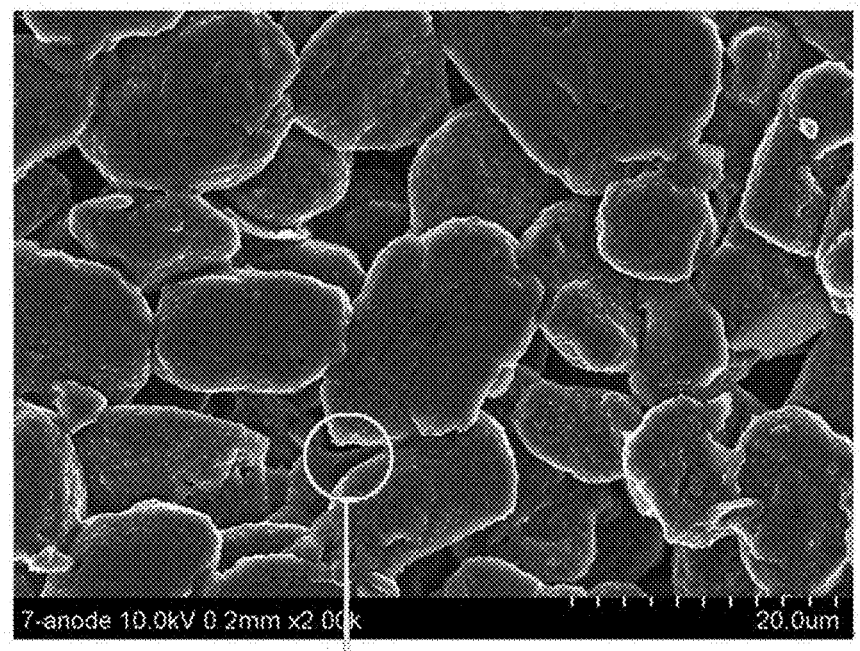
FIG. 4 is the SEM photograph ((a) capture time: 40 seconds) showing the negative electrode obtained by disassembling the rechargeable lithium battery cell after the charge and discharge according to Comparative Example 2 and a SEM photograph (b) enlarging the SEM photograph (a).
Figure 4:
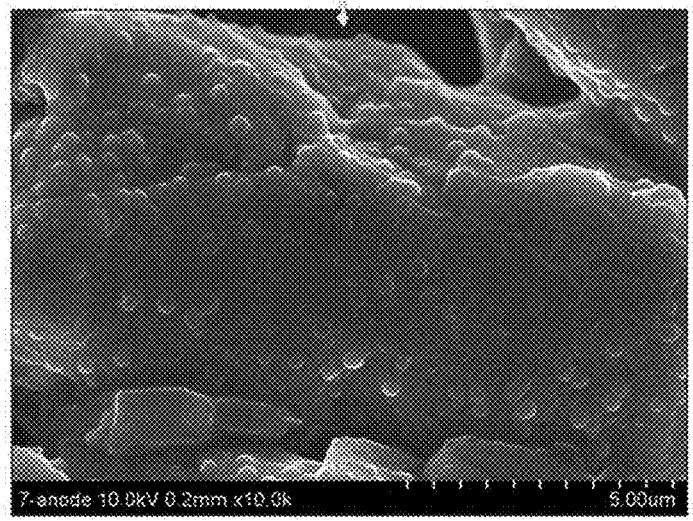

In addition, FIG. 4 (a) (enlargement: 2000 times, capture time: 40 seconds) shows a different surface of the negative electrode according to Comparative Example 2 from the surface thereof as shown in FIGS. 3A and 3B, and FIG. 4 (b) (enlargement: 10,000 times, capture time: 40 seconds) show a SEM photograph enlarging a circle part in FIG. 4 (a). As shown in FIGS. 4 (a) and (b), a dot was formed all (almost all) over the surface of the negative electrode according to Comparative Example 2. In other words, a dot was formed in the very large area of the surface of the negative electrode.

Figure 5A:
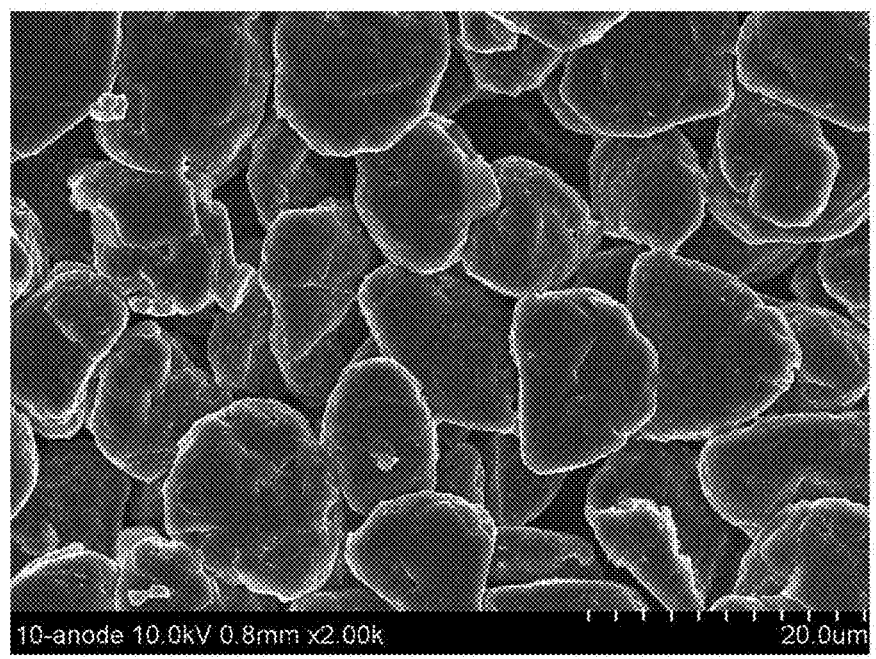
FIGS. 5A and 5B are SEM photographs showing the negative electrode obtained by disassembling a rechargeable lithium battery cell after the charge and discharge according to Example 3.
Figure 5B:
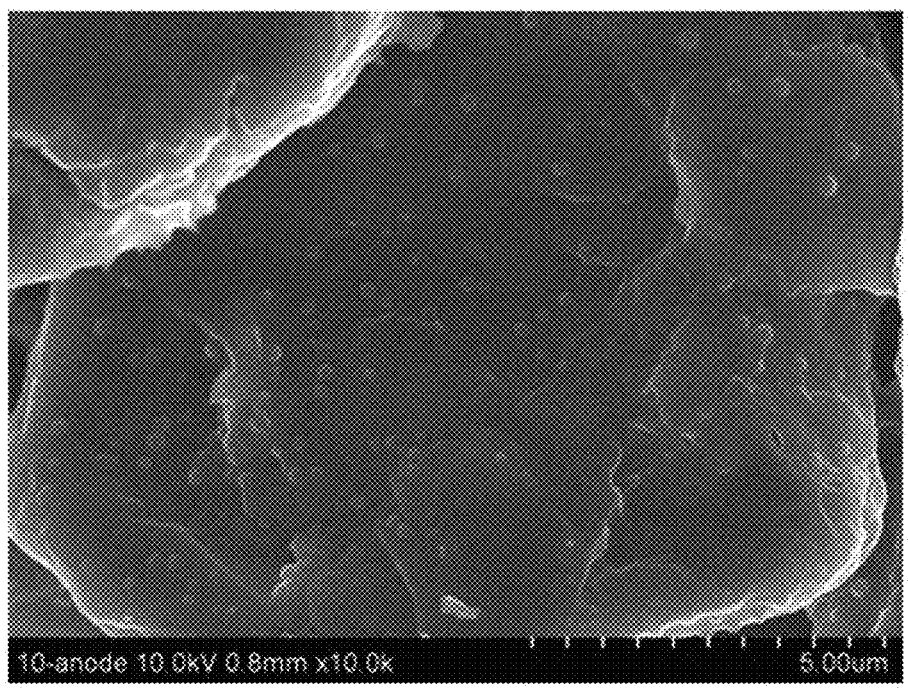
Figure 6A:
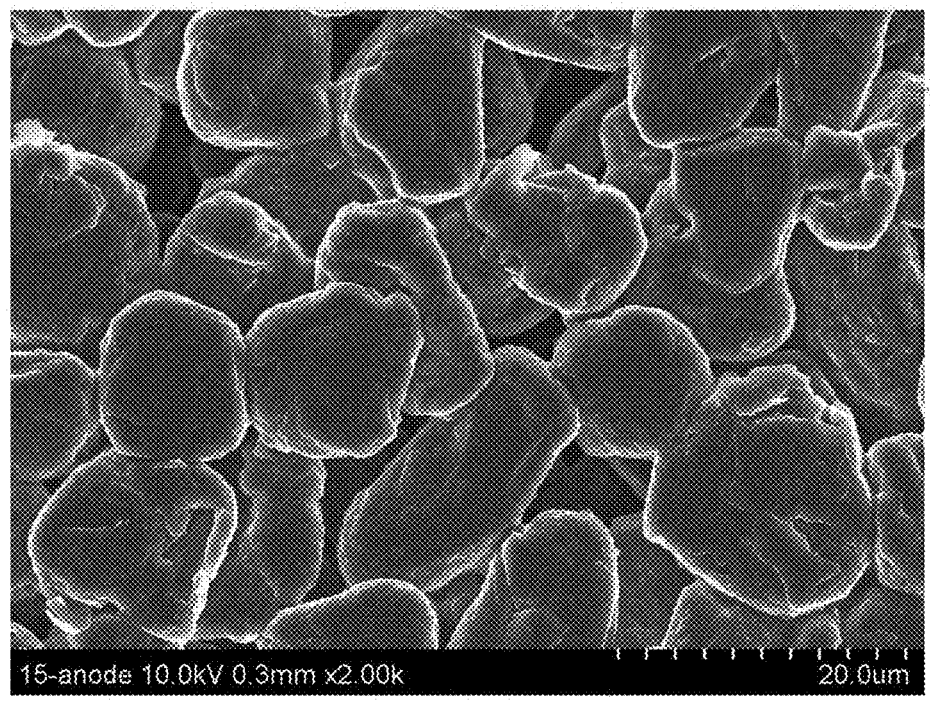
FIGS. 6A and 6B are SEM photographs showing the negative electrode obtained by disassembling a rechargeable lithium battery cell after the charge and discharge according to Comparative Example 3.
Figure 6B:
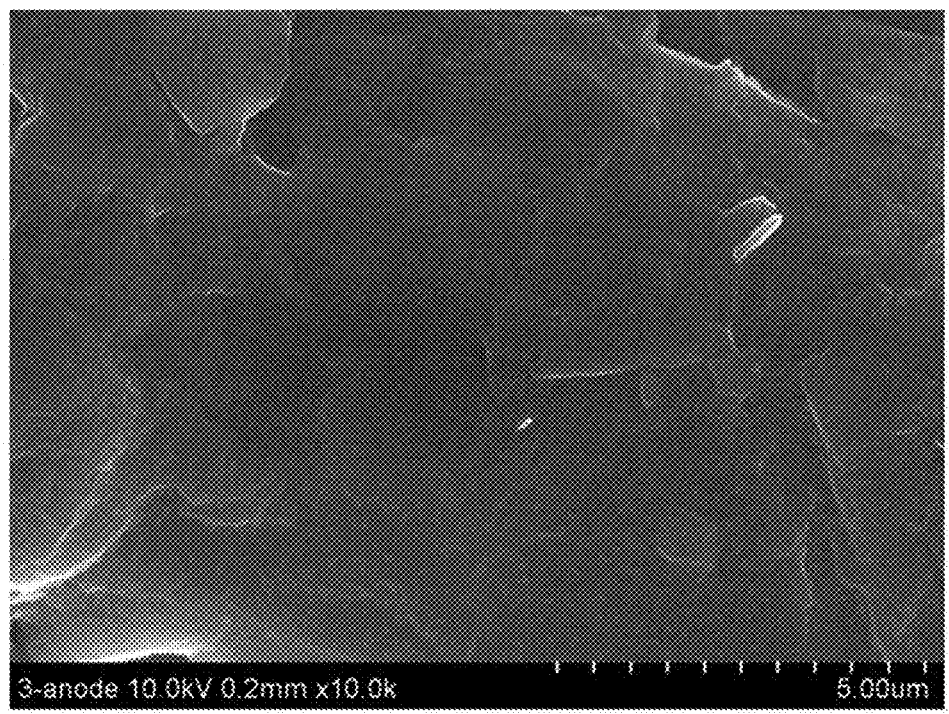

FIG. 5A is a SEM photograph showing the surface of the negative electrode of Example 3, and FIG. 5B shows a 4 times enlarged part of the SEM photograph in FIG. 5A. FIG. 6A is a SEM photograph showing the surface of the negative electrode according to Comparative Example 3, and FIG. 6B shows a 4 times enlarged part of the SEM photograph in FIG. 6A. Referring to FIG. 5B, the negative electrode according to Example 3 had a spherical dot on the surface. Referring to FIG. 6B, the negative electrode according to Comparative Example 3 had no dot on the surface.

Figure 7:
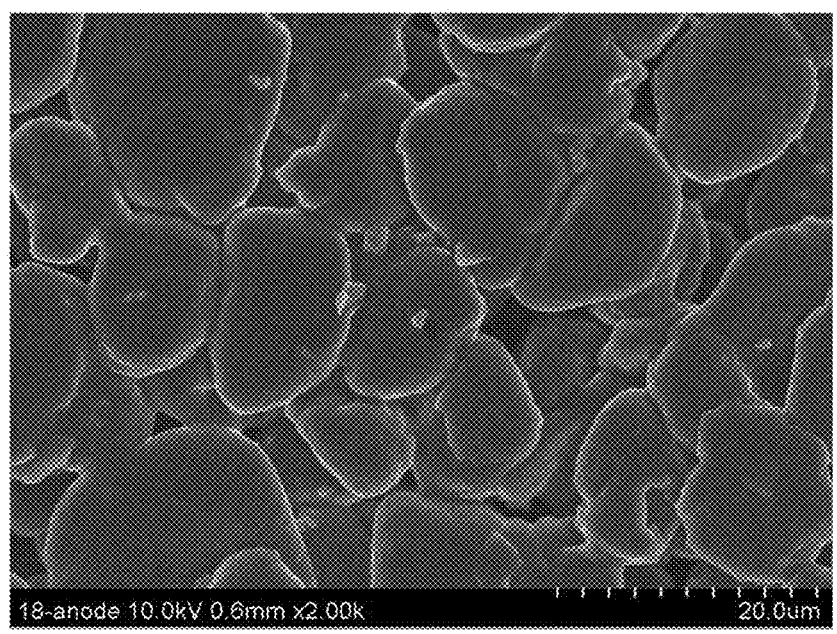
FIG. 7 is a SEM photograph showing the negative electrode obtained by disassembling a rechargeable lithium battery cell after the charge and discharge according to Example 4.
Figure 8:
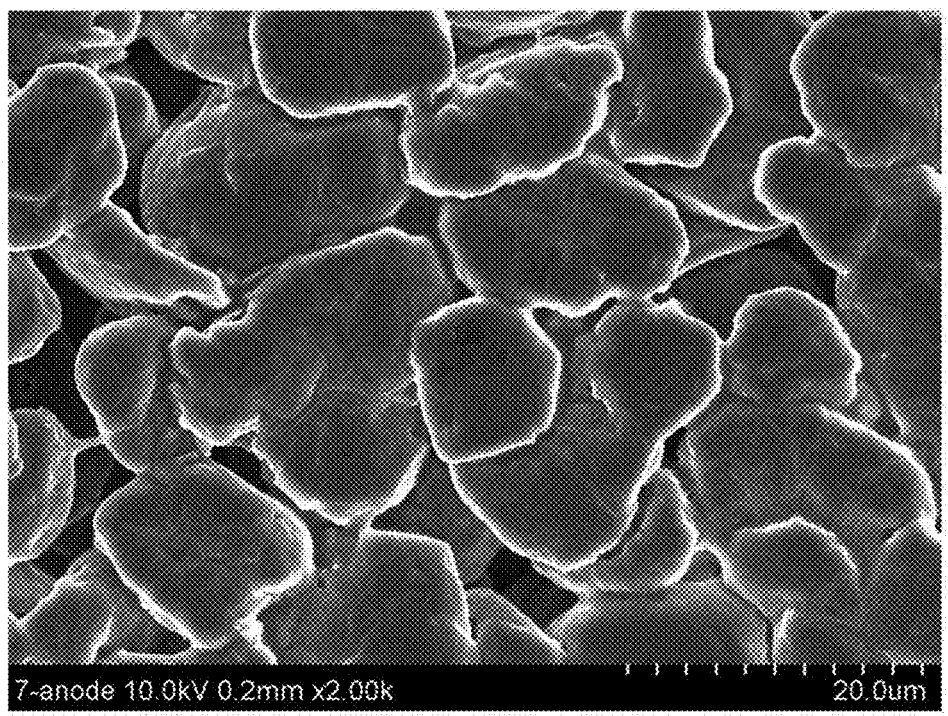
FIG. 8 is a SEM photograph showing the negative electrode obtained by disassembling a rechargeable lithium battery cell after the charge and discharge according to Comparative Example 4.

Furthermore, FIGS. 7 and 8 respectively show SEM photographs of the negative electrodes obtained by disassembling the lithium rechargeable battery cells according to Example 4 and Comparative Example 4 after the charge and discharge. Referring to FIGS. 7 and 8, the negative electrode according to Example 4 had a dot on the surface, but the negative electrode according to Comparative Example 4 had no dot thereon.

Comparative Example 5

A positive active material slurry was prepared by mixing a Li(Ni$_{0.5}$Co$_{0.2}$Mn$_{0.3}$)O$_2$) positive active material, a polyvinylidene fluoride binder, and a denka black conductive material in a ratio of 92:4:4 wt % ratio in N-methylpyrrolidone.

The positive active material slurry was coated on an Al current collector, dried, and compressed.

On the other hand, a negative active material slurry was prepared by mixing an artificial graphite negative active material, a carboxylmethylcellulose thickener, and a styrene butadiene rubber binder in a ratio of 97.5:1:1.5 wt % in a water solvent.

The negative active material slurry was coated on a Cu current collector, dried, and compressed, fabricating a negative electrode.

In addition, an electrolyte was prepared by dissolving 1.3M of LiPF$_6$ in a mixed solvent of ethylene carbonate, ethylmethyl carbonate, and dimethyl carbonate in a volume ratio of 3:4:3.

The positive and negative electrodes and the electrolyte were used to fabricate a rechargeable lithium battery cell in a conventional method.

The rechargeable lithium battery cell was charged and discharged with 0.05 C under a cut-off voltage ranging from 2.0V to 4.65V.

Comparative Example 6

A rechargeable lithium battery cell was fabricated according to the same method as Comparative Example 5 except for using an electrolyte prepared by dissolving 1.3M of LiPF$_6$ in a mixture of ethylene carbonate, ethylmethyl carbonate, dimethyl carbonate, and an additive represented by the following formula 5 in a volume ratio of 27:36:27:10 and then, charged and discharged.

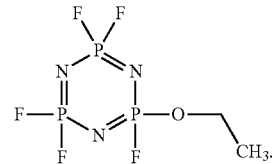

Chemical Formula 5

Figure 9:
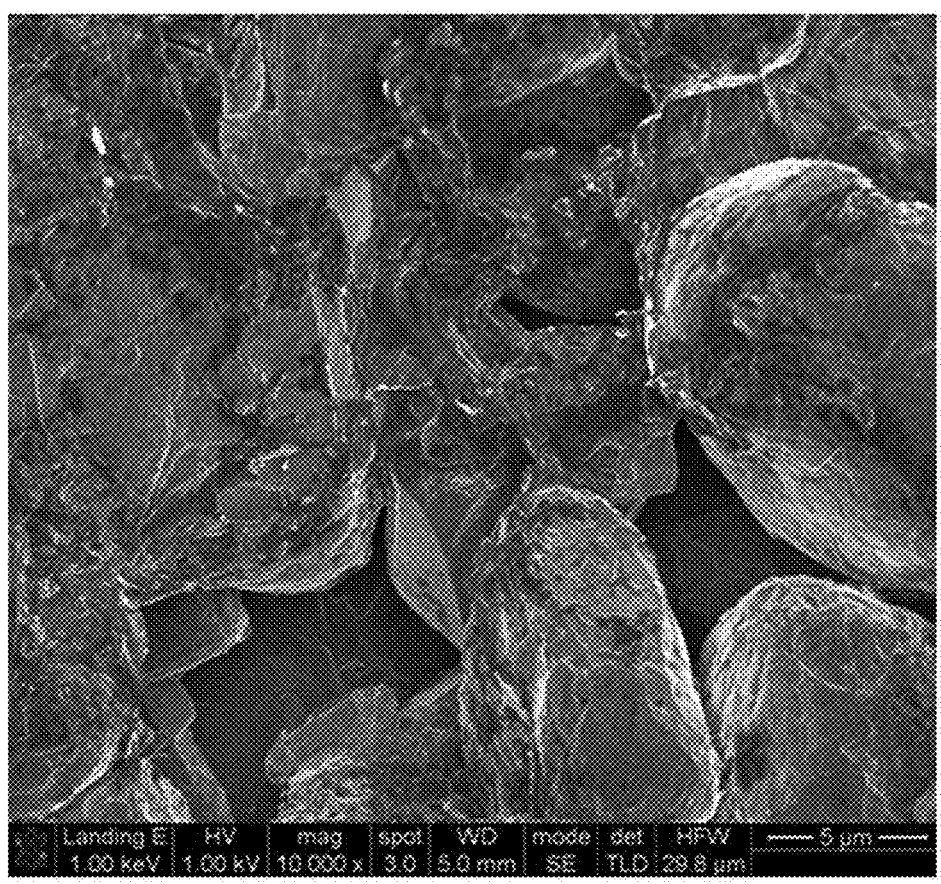
FIG. 9 is a SEM photograph showing the negative electrode obtained by disassembling a rechargeable lithium battery cell after the charge and discharge according to Comparative Example 5.
Figure 10:
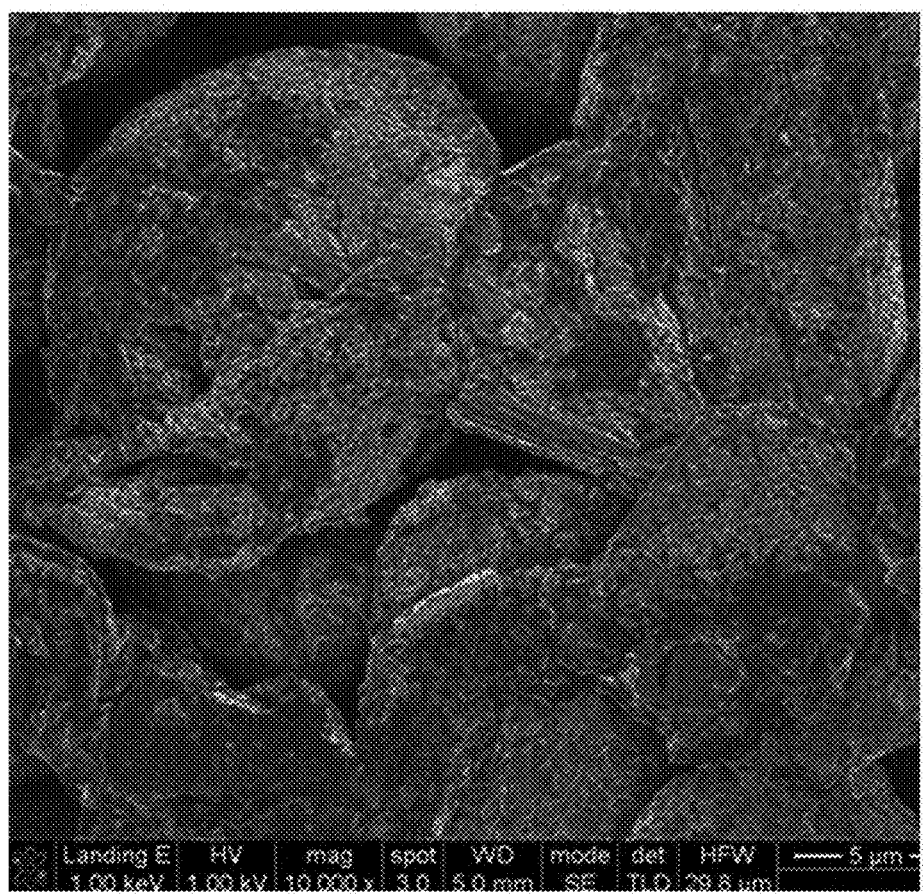
FIG. 10 is a SEM photograph showing the negative electrode obtained by disassembling a rechargeable lithium battery cell after the charge and discharge according to Comparative Example 6.

The rechargeable lithium battery cells according to Comparative Examples 5 and 6 were decomposed after the charge and discharge to obtain the negative electrode therein. FIGS. 9 and 10 are SEM photographs showing the surface of the negative electrodes. As shown in FIGS. 9 and 10, the negative electrodes according to Comparative Examples 5 and 6 had no dot on the surface.

Impedance Measurement

Figure 11:
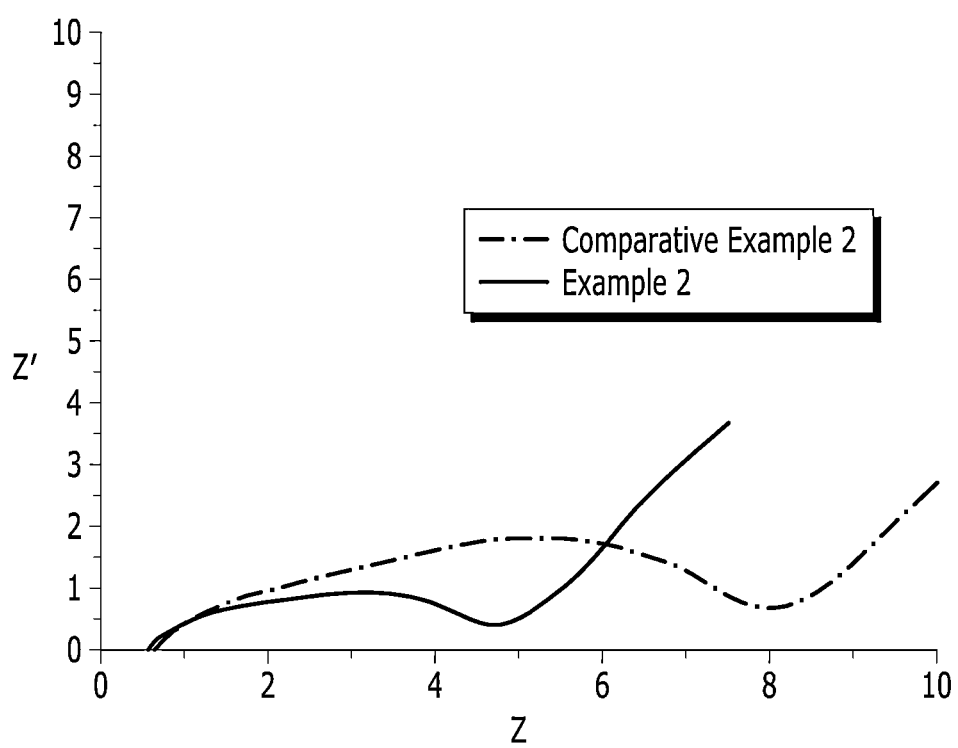
FIG. 11 is a graph showing impedance of the rechargeable lithium batteries cell after the charge and discharge according to Example 2 and Comparative Example 2.

The lithium rechargeable battery cells charged and discharged according to Example 2 and Comparative Example 2 were measured regarding impedance under a SOC50 condition (SOC50: charge to have 50% of charge capacity based on 100% of the entire charge capacity of the battery cells) using 1470E Multichannel Potentiostat/CellTest System (Solartron Analytical, Farnborough, Hampshire, UK) under a condition ranging from 106 to 0.1 Hz (10 mV). The results are provided in FIG. 11 (Z and Z' unit: ohm). As shown in FIG. 1, the cell according to Example 2 had very low impedance compared to the one according to Comparative Example 2.

Example 5

A pouch-type rechargeable lithium battery cell having capacity of 15 mAh was fabricated using the positive and negative electrode and the electrolyte according to Example 1 in a conventional process.

Example 6

The rechargeable lithium battery cell according to Example 1 was once charged and discharged with 0.05 C under a cut-off voltage ranging from 2.0V to 4.5V.

Comparative Example 5

A rechargeable lithium battery cell was fabricated according to the same method as Example 1 except for using an electrolyte prepared by dissolving 1.3M of LiPF$_6$ in a mixture of ethylene carbonate, ethylmethyl carbonate, and dimethyl carbonate in a volume ratio of 3:4:3.

Comparative Example 6

The rechargeable lithium battery cell according to Comparative Example 5 was once charged and discharged with 0.05 C under a cut-off voltage ranging from 2.0V to 4.5V.

Figure 12:
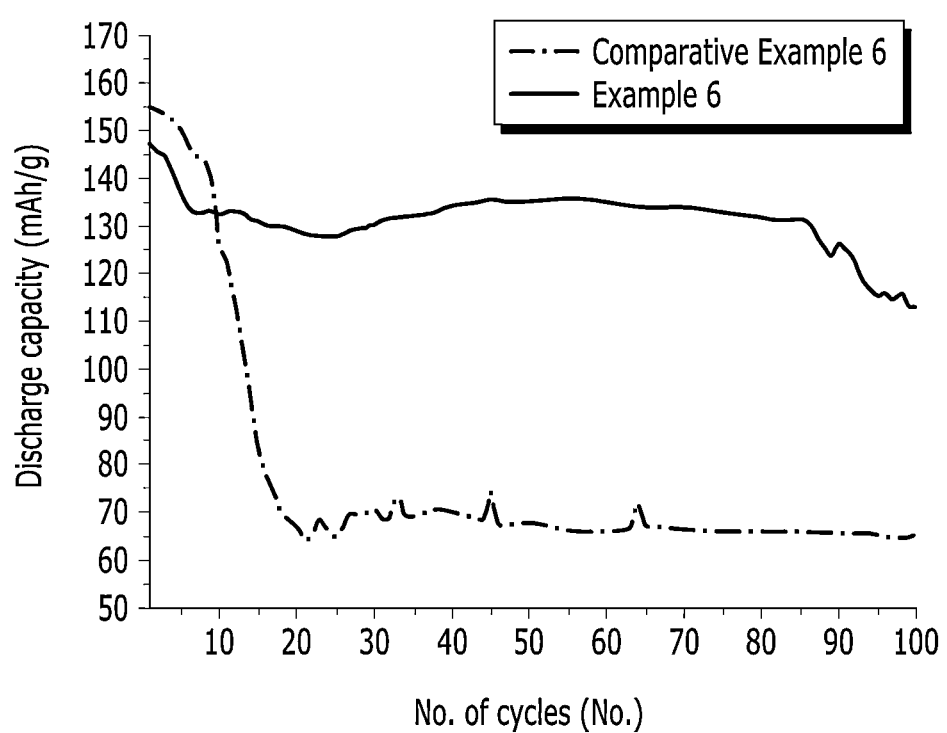
FIG. 12 is a graph showing cycle life characteristic of the rechargeable lithium battery cells after the charge and discharge according to Example 6 and Comparative Example 6.

The rechargeable lithium battery cells according to Example 6 and Comparative Example 6 were charged and discharged 100 times with 1 C and then, evaluated regarding cycle life characteristics. The results are provided in FIG. 12. As shown in FIG. 12, the rechargeable lithium battery cell according to Example 6 had very small capacity deterioration after 100 charge and discharge cycles, while the battery cell according to Comparative Example 6 had sharply increased capacity deterioration after 20 charge and discharge cycles.

In the present disclosure, the terms "Example," and "Comparative Example" are used arbitrarily to simply identify a particular example or experimentation and should not be interpreted as admission of prior art. While this disclosure has been described in connection with what is presently considered to be practical exemplary embodiments, it is to be understood that the invention is not limited to the disclosed embodiments and is intended to cover various modifications and equivalent arrangements included within the spirit and scope of the appended claims. Therefore, the aforementioned embodiments should be understood to be exemplary but not limiting this disclosure in any way.

What is claimed is:

1. A rechargeable lithium battery, comprising:
a positive electrode including a composite positive active material including Chemical Formula 2;
a negative electrode including a carbon-based negative active material; and
an electrolyte including an additive, a lithium salt, and an organic solvent, wherein the additive is:

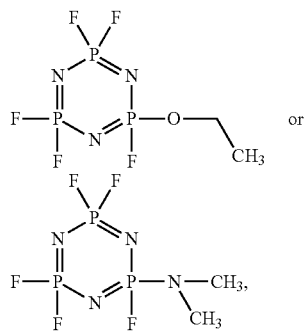

wherein the additive is included in an amount of about 1 volume % to about 20 volume % based on the total amount, 100 volume %, of the organic solvent,
wherein a passivation film having dots as morphological features of its surface is formed on a surface of the negative electrode after charge and discharge of the rechargeable lithium battery, wherein each dot has a spherical shape having a diameter of 0.2 µm to 2 µm and wherein the dots are present at an area of greater than or equal to about 1% and less than about 20% based on the entire area, 100% of the negative electrode,
wherein the charge and discharge is performed at about 2.0V to about 4.65V, and
wherein the charge and discharge is performed at less than or equal to about 0.5 C:

$$p\text{Li}_2\text{MnO}_3\text{-}(1-p)\text{LiNi}_a\text{Co}_b\text{Mn}_c\text{O}_2 \qquad \text{Chemical Formula 2}$$

wherein, in Chemical Formula 2,
0<p<1, 0<a<1, 0<b<1, 0<c<1, and a+b+c=1.

2. The rechargeable lithium battery of claim 1, wherein the additive is included in an amount of 1 volume % to 20 volume % based on the total amount, 100 volume %, of the organic solvent.

3. The rechargeable lithium battery of claim 1, wherein the carbon-based negative active material is crystalline carbon.

4. The rechargeable lithium battery of claim 1, wherein the dots are present at an area of greater than or equal to 1% and less than 20% based on the entire area, 100% of the negative electrode.

5. The rechargeable lithium battery of claim 1, wherein the charge and discharge is performed at 2.0V to 4.65V.

6. The rechargeable lithium battery of claim 1, wherein the charge and discharge is performed at less than or equal to 0.5 C.

7. The rechargeable lithium battery of claim 1, wherein the passivation film includes LiF.

8. The rechargeable lithium battery of claim 1, wherein the additive is:

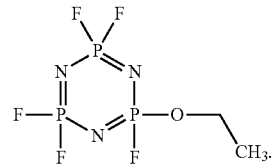 [SMILES: CCOP1(F)=NP(F)(F)=NP(F)(F)=N1]

9. The rechargeable lithium battery of claim 1, wherein the additive is:

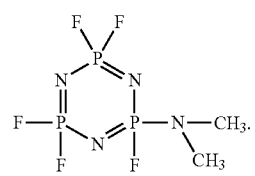

* * * * *